(12) United States Patent
Shigenaga et al.

(10) Patent No.: US 11,054,100 B2
(45) Date of Patent: Jul. 6, 2021

(54) LIGHT ADJUSTMENT SYSTEM OF LIGHTING DEVICES

(71) Applicant: HIKARIYANE CORPORATION, Tokyo (JP)

(72) Inventors: Yukitoshi Shigenaga, Tokyo (JP); Hiroyuki Matsumoto, Nagareyama (JP)

(73) Assignee: HIKARIYANE CORPORATION, Tokyo (JP)

( * ) Notice: Subject to any disclaimer, the term of this patent is extended or adjusted under 35 U.S.C. 154(b) by 0 days.

(21) Appl. No.: 16/862,768

(22) Filed: Apr. 30, 2020

(65) Prior Publication Data

US 2020/0256533 A1    Aug. 13, 2020

Related U.S. Application Data

(63) Continuation of application No. PCT/JP2018/041840, filed on Nov. 12, 2018.

(30) Foreign Application Priority Data

Nov. 27, 2017    (JP) .............................. JP2017-238115

(51) Int. Cl.
*F21S 19/00* (2006.01)
*E04D 13/03* (2006.01)
(Continued)

(52) U.S. Cl.
CPC ............ *F21S 19/005* (2013.01); *E04D 13/03* (2013.01); *F21S 11/007* (2013.01); *H02S 20/24* (2014.12); *H05B 47/10* (2020.01); *H02S 20/23* (2014.12)

(58) Field of Classification Search
CPC ..... F21S 11/007; F21S 19/005; H05B 47/105; H05B 47/10; E04D 13/03
See application file for complete search history.

(56) References Cited

U.S. PATENT DOCUMENTS

| 8,381,449 B1* | 2/2013 | Hodgetts ................. E04B 7/102 52/1 |
| 8,763,324 B2* | 7/2014 | Pendley ................ E04D 13/031 52/200 |

(Continued)

FOREIGN PATENT DOCUMENTS

| JP | 2006-73419 A | 3/2006 |
| JP | 2008-59859 A | 3/2008 |

(Continued)

OTHER PUBLICATIONS

International Search Report dated Feb. 19, 2019, issued in counterpart International Application No. PCT/JP2018/041840 (2 pages).

(Continued)

*Primary Examiner* — Christopher E Mahoney
(74) *Attorney, Agent, or Firm* — Westerman, Hattori, Daniels & Adrian, LLP (57) ABSTRACT

An illuminance obtained by light passed through light diffusion type skylight windows is affected by the weather. This is to solve such problems by polarization of lighting devices and control technology in addition to improvements in the quality of skylights themselves, and the advantages of the high natural lighting offered by light diffusion type skylight windows are now being utilized. A set value that is the result of associating a required work surface illuminance for indoors with the work surface illuminance obtained by light passed through light diffusion type skylight windows and the generated power of a photovoltaic power generation panels is set as a reference for a light adjustment signal. In situations such as winter sunsets and rainy weather which are in a range equal to or less than the set value, light adjustment of lighting devices is performed by a signal transmitted from the photovoltaic power generation panels.

4 Claims, 7 Drawing Sheets

(51) Int. Cl.
*F21S 11/00* (2006.01)
*H02S 20/24* (2014.01)
*H05B 47/10* (2020.01)
*H02S 20/23* (2014.01)

(56) References Cited

U.S. PATENT DOCUMENTS

| | | | |
|---|---|---|---|
| 9,101,011 B2 * | 8/2015 | Sawada | H02J 3/385 |
| 9,151,879 B2 * | 10/2015 | Den Boer | G02B 3/0056 |
| 9,781,884 B1 * | 10/2017 | Iwai | A01C 21/00 |
| 2016/0273726 A1 * | 9/2016 | Adler | F21S 11/00 |

FOREIGN PATENT DOCUMENTS

| | | |
|---|---|---|
| JP | 2010-160975 A | 7/2010 |
| JP | 2011-18459 A | 1/2011 |
| JP | 2011-171019 A | 9/2011 |
| JP | 2013-45655 A | 3/2013 |
| JP | 2014-186962 A | 10/2014 |
| JP | 2015-204177 A | 11/2015 |
| WO | 2011/111442 A1 | 9/2011 |

OTHER PUBLICATIONS

Notice of Reasons for Refusal dated Jun. 26, 2018, issued in counterpart JP Patent Application No. 2017-238115, w/ English translation (12 pages).
Notice of Reasons for Refusal dated Dec. 4, 2018, issued in counterpart JP Patent Application No. 2017-238115, w/English translation (6 pages).
Decision to Grant a Patent dated Mar. 5, 2019, issued in counterpart JP Patent Application No. 2017-238115, w/English translation (5 pages).

* cited by examiner

LIGHT ADJUSTMENT SYSTEM OF LIGHTING DEVICES

BACKGROUND OF THE INVENTION

Field of the Invention

The present invention relates to a light adjustment system of lighting devices for controlling the lighting devices depending on electrical power, voltage or current generated by photovoltaic power generation panels or solar panels installed on the same roof as that of the light diffusion type skylight windows.

Description of the Related Art

An outdoor illuminance consists of a direct sunlight illuminance and a skylight illuminance (hereinafter referred to as a sunlight illuminance). There has been a technology in which light diffusion type skylights or light diffusion type skylight windows are installed on the roof to diffuse the sunlight for utilizing in general illumination or local illumination. By passing uniform light into the indoor using this technology, it is possible to reduce the power consumption of the lighting device by about 60%. There is a system installing solar panels on the roof to generate electrical power, and also there is a combination system installing both the solar panels and the light diffusion type skylight windows on the same roof. In the latter combination system, the solar panels are arranged on the roof of such as a folded-plate roof or a sheet waterproof roof between the light diffusion type skylight windows, respectively. Such combination system has been adopted in factories or logistics storages with a large roof area, for saving energy by means of the light diffusion type skylight windows and for generating energy by means of the solar panels.

However, since the light taken into the indoor through the light diffusion type skylight windows depended on the intensity of the sunlight, it was impossible to keep the illuminance in the indoor constant. Thus, the insufficient illuminance in the indoor was compensated by installing the lighting devices together with the light diffusion type skylight windows. If the illuminance frequently changed depending on the change in the weather and the illuminance caused by the light diffusion type skylight windows became insufficient, it was necessary to repeatedly turn on and off the lighting devices. As a result, the lighting devices might be kept on for a long time causing the advantages of the light diffusion type skylight windows to reduce.

Patent Document 1 discloses arrangement of a natural light sensor. Patent Document 2 discloses a light adjusting system in which sunlight through windows and light from lighting devices are used together. However, according to this system of Patent Document 2, since the sunlight is entered through side windows, not through skylight windows, the entered light is not uniform and therefore deep general lighting cannot be expected. Patent Document 3 discloses a system in which a photovoltaic power generation panel and a lighting device are integrated. In this system of Patent Document 3, the amount of electrical power generated by the photovoltaic power generation panel is monitored to obtain external electrical power when the amount of the generated electrical power is insufficient. Patent document 4 discloses an illumination system in which the brightness of the outdoors is judged by an electrical power generation amount of photovoltaic power generation panels to adjust the light of indoor lighting devices.

Patent Document 1: Japanese Patent Publication 2010-160975A

Patent Document 2: Japanese Patent Publication 2006-073419A

Patent Document 3: Japanese Patent Publication 2013-045655A

Patent Document 4: Japanese Patent Publication 2014-186962A

The light diffusion type skylight window was in general designed and installed alone, and sometimes such skylight window could not provide sufficient illuminance due to broken weather. In that case, the lighting devices were kept on for a long time causing no power saving effect.

Thus, it might be necessary to provide a system for optionally adjusting light of the lighting devices in accordance with the illuminance of the indoor. However, in the conventional system, no device for always measuring or detecting the illuminance of the indoor was provided.

SUMMARY OF THE INVENTION

It is therefore an object of the present invention to solve these problems.

A light adjustment system of lighting devices is provided with light diffusion type skylight windows for collecting natural light into the indoor and photovoltaic power generation panels or solar panels. The light diffusion type skylight windows and the solar panels are arranged to receive sunlight under the same conditions. According to this light adjustment system, a work surface illuminance at an optional position obtained by light passed through the light diffusion type skylight windows is associated with electrical power, current or voltage generated by the solar panels.

According to the present invention, a light adjustment system of lighting devices, includes light diffusion type skylight windows evenly disposed on a roof surface so that a work surface illuminance obtained by light, passed through the light diffusion type skylight windows at an indoor arbitrary position becomes uniform, and photovoltaic power generation panels arranged so that sunlight is irradiated on the photovoltaic power generation panels under the same conditions (for example, the same angle with respect to the sunlight) as the light diffusion type skylight windows. The work surface illuminance at an optional position obtained by light passed through the light diffusion type skylight windows and the generated power, the current or the voltage of the photovoltaic power generation panels are associated with each other in direct proportion. The generated power, the current or the voltage of the photovoltaic power generation panels when the work surface illuminance at an optional position obtained by light passed through elight diffusion type skylight windows is equal to a required work surface illuminance is determined as a set power value for turning on, turning off or light adjustment of the lighting devices.

When a work surface illuminance due to the general illumination or the local illumination obtained by the light passed through the light diffusion type skylight windows is equal to the required illuminance on the work surface, an electrical power generated by photovoltaic power generation panels or solar panels is called as a set power value, and the illuminance at that time is called as a set illuminance value. Only when the work surface illuminance by the illumination obtained by the light passed through the light diffusion type skylight windows is equal to or less than the set illuminance value, that is, only when the electrical power generated by the solar panels is equal to or less than the set power value, the lighting devices are turned on to use light from the lighting devices. When the generated power is more than the set power value, the lighting devices are turned off without using any special device or human operations. In an embodiment of the present invention, if the required illuminance on the work surface is about 400 lux, it is not necessary to use any illumination power supply in the bright and clear daytime.

It is preferred that, the lighting devices are turned on when the generated power, the current or the voltage of the photovoltaic power generation panels is equal to or less than the set power value, and wherein the lighting devices are turned off when the generated power, the current or the voltage of the photovoltaic power generation panels is more than the set power value.

It is preferred that the photovoltaic power generation panels are arranged on the roof surface. It is also preferred that the light diffusion type skylight windows and the photovoltaic power generation panels are alternately arranged side by side.

It is further preferred that the light diffusion type skylight windows are installed to occupy 3-7% of an area of the roof surface and the photovoltaic power generation panels are installed in the remaining area of the roof surface.

According to the present invention, it is possible to reduce lighting energy and $CO_2$ by 60% or more, and to generate electrical power. Also, the life of the lighting devices can be extended.

Further objects and advantages of the present invention will be apparent from the following description of the preferred embodiments of the invention as illustrated in the accompanying drawings.

DESCRIPTION OF THE PREFERRED EMBODIMENT

Hereinafter, embodiments of the present invention will be described in detail based on the drawings. The present invention however can be implemented in many different modifications, and should not be limited to the description of this embodiment. Mote that the same reference numbers are used to the same elements throughout the embodiment.

Figure 1:
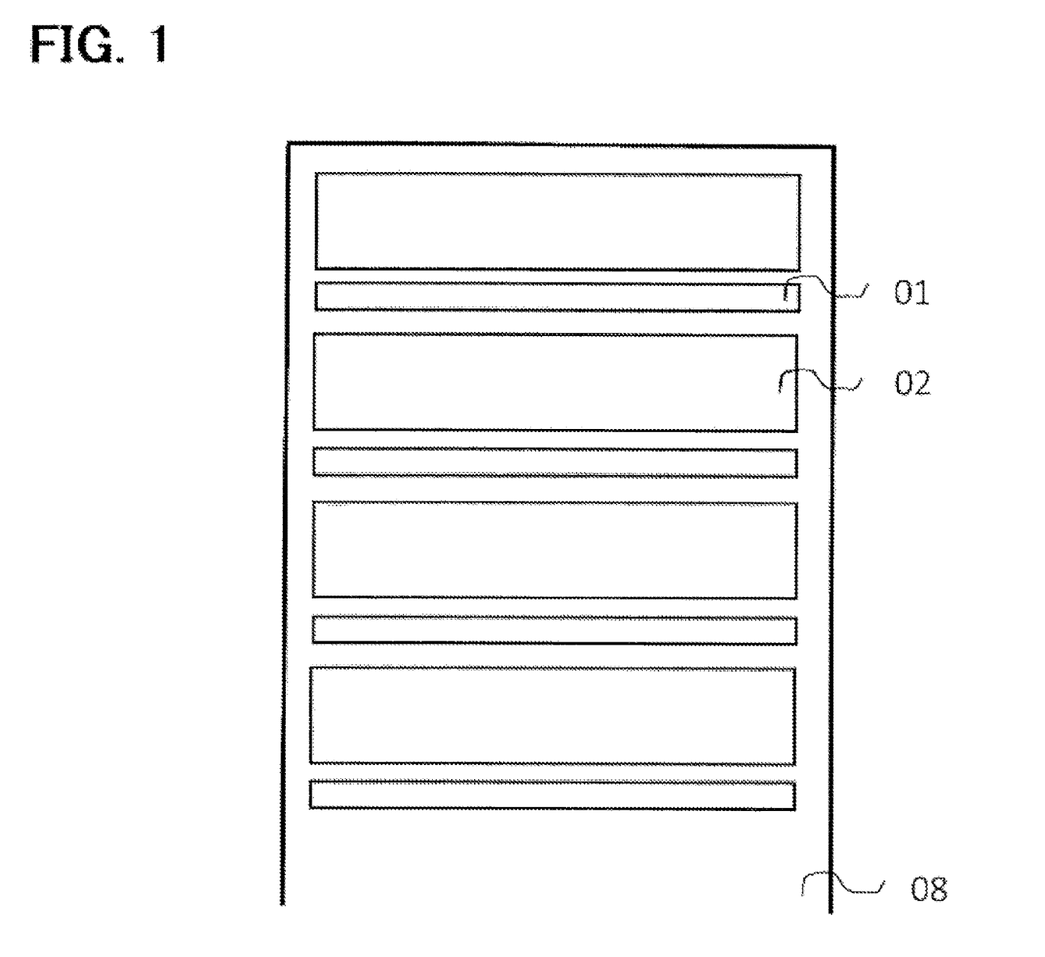
FIG. 1 is a plane view illustrating arrangement of photovoltaic power generation panels or solar panels and light diffusion type skylight windows installed for general illumination on the roof on the same conditions.
Figure 2:
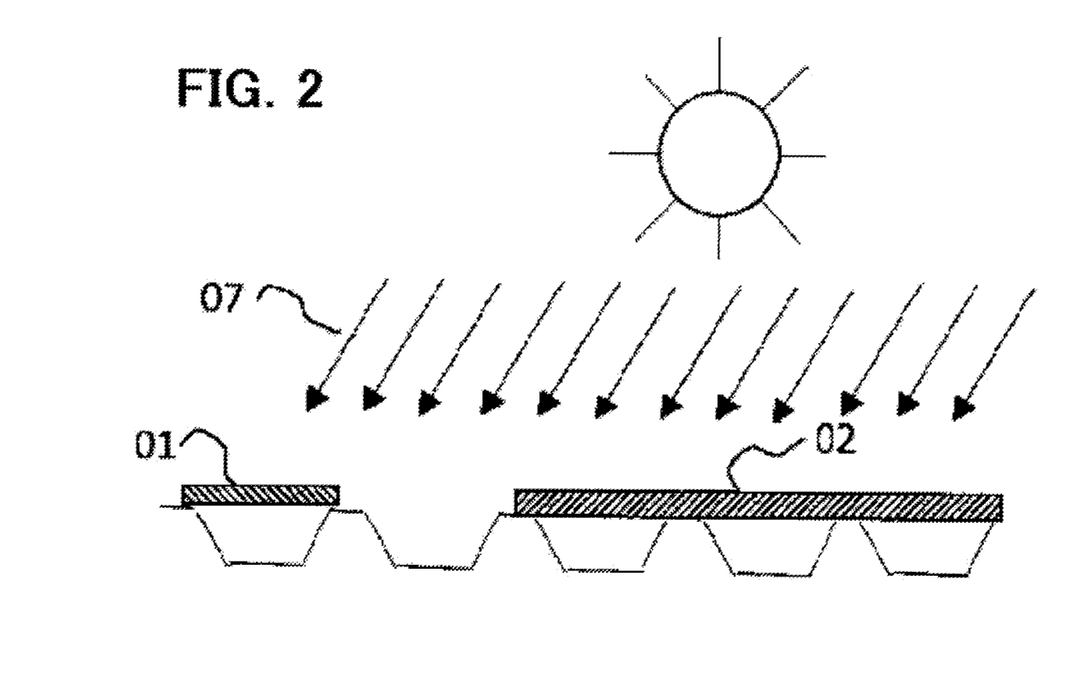
FIG. 2 is a sectional view illustrating the solar panels and the light diffusion type skylight windows installed on the roof.
Figure 3:
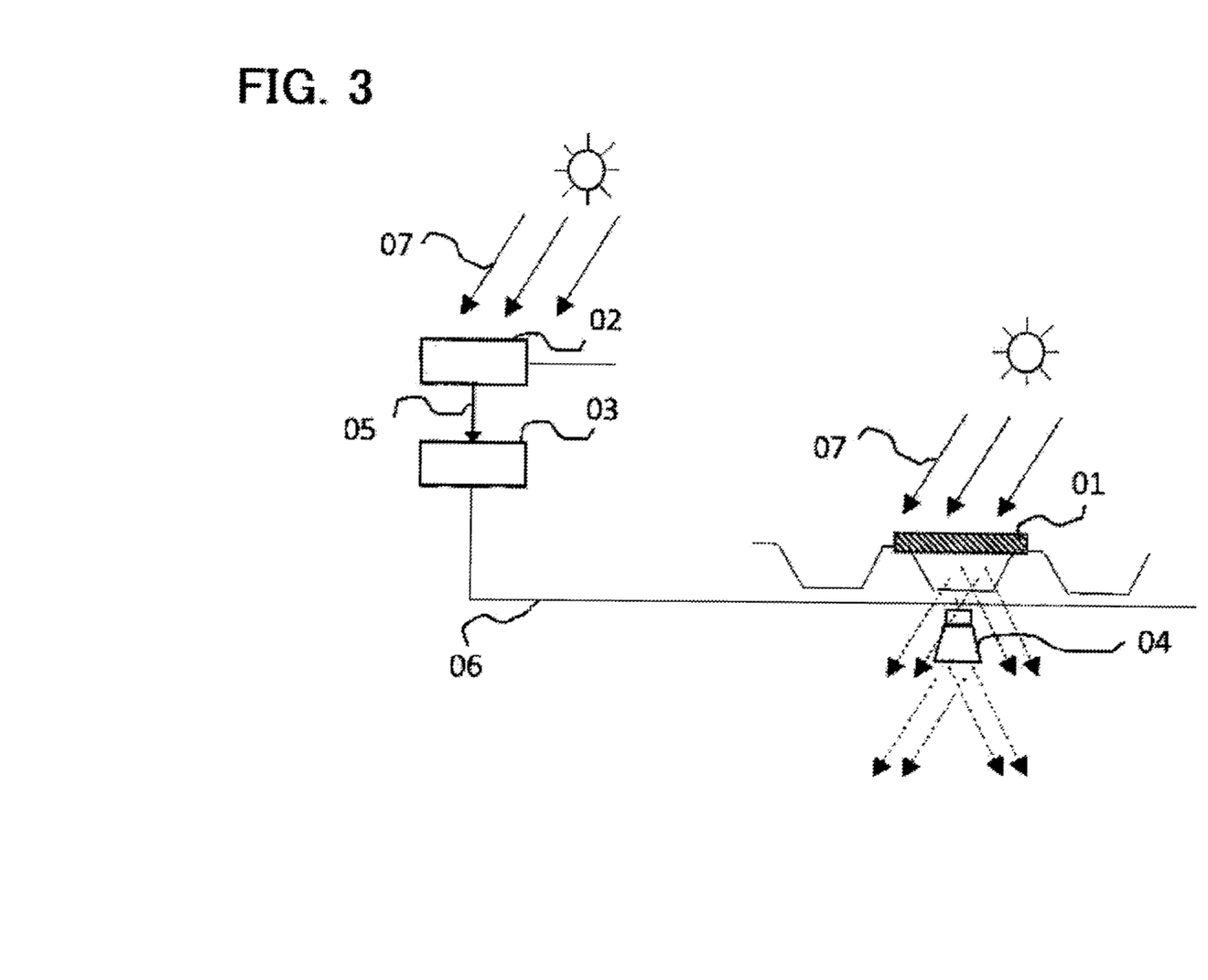
FIG. 3 is an arrangement and wiring view illustrating the solar panels, a control device, light diffusion type skylight windows and lighting devices with light control.
Figure 4:
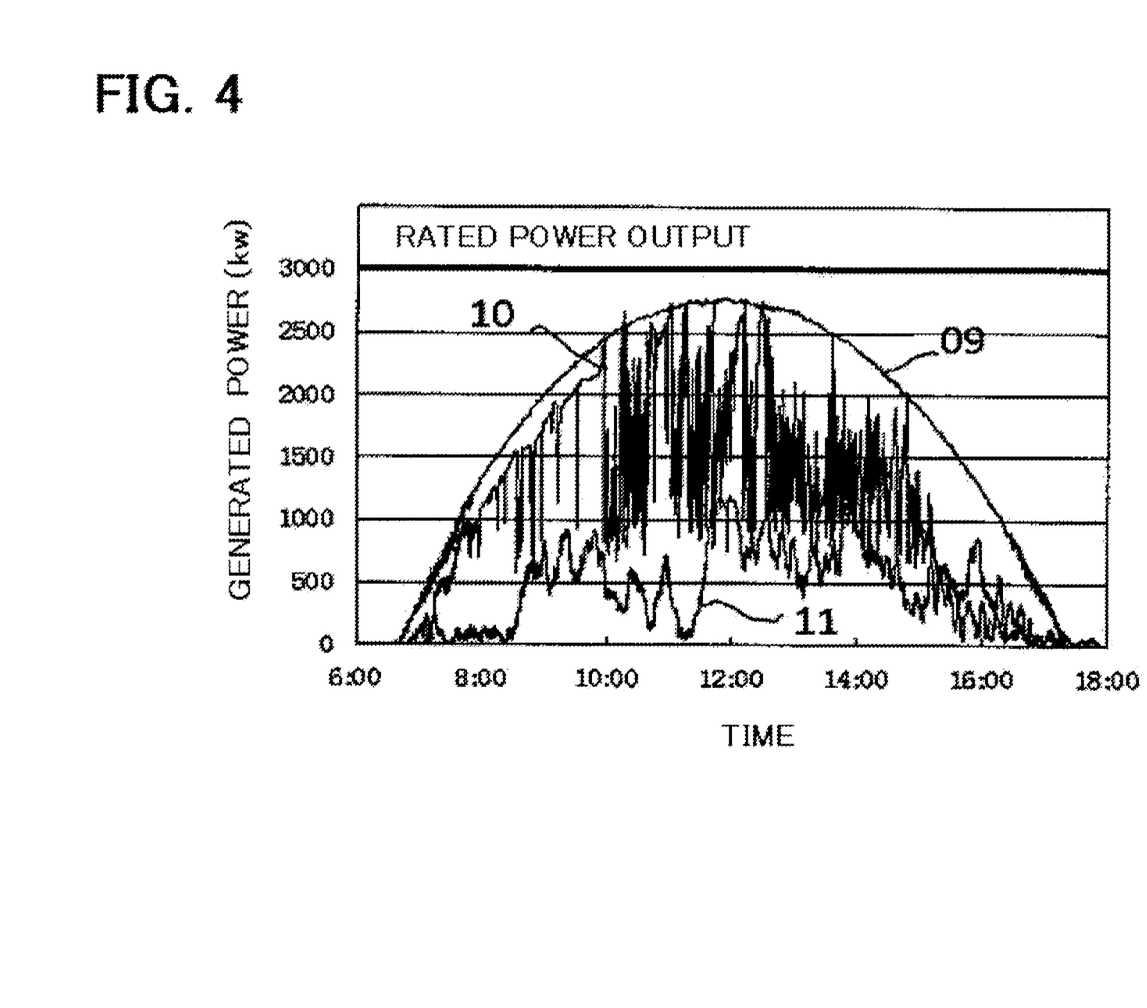
FIG. 4 is a graph illustrating generated electrical power curve of photovoltaic power generation system.
Figure 5:
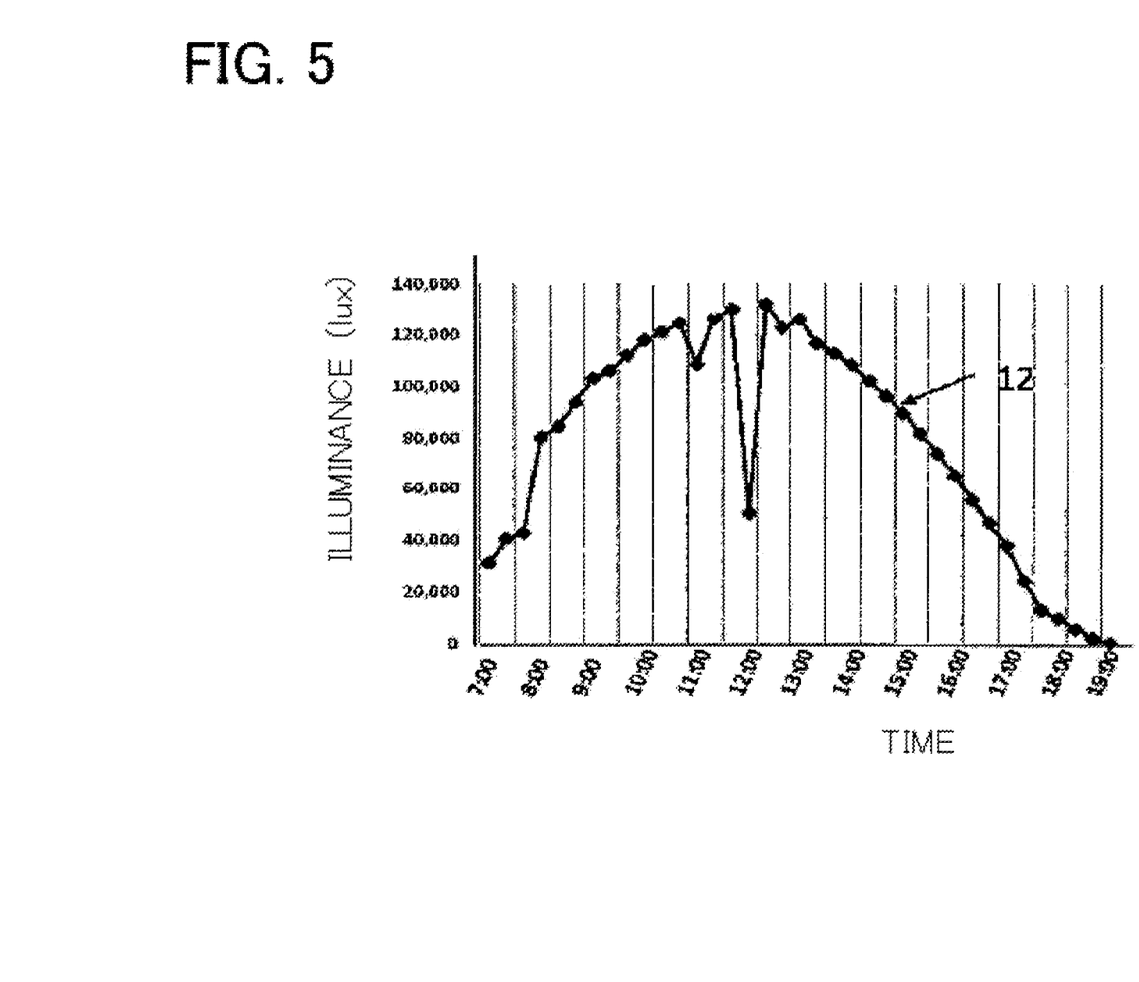
FIG. 5 is a graph illustrating measured outside illuminance at bright and clear weather.
Figure 6:
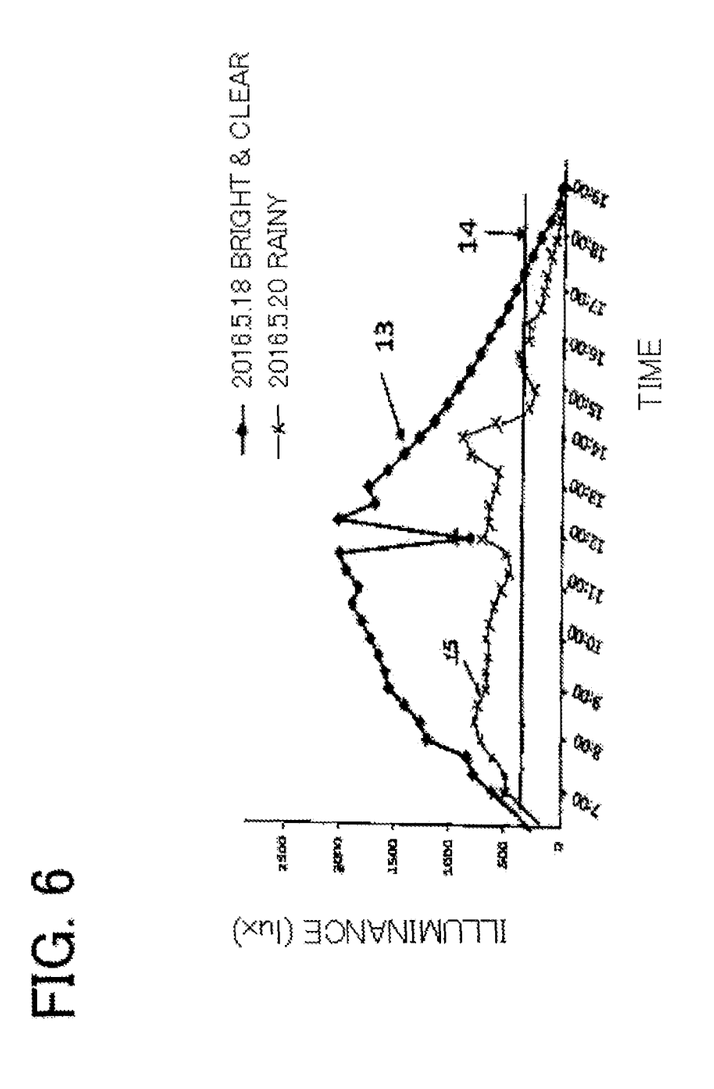
FIG. 6 is a graph illustrating measured illuminance obtained by the light passed through the light diffusion type skylight windows.
Figure 7:
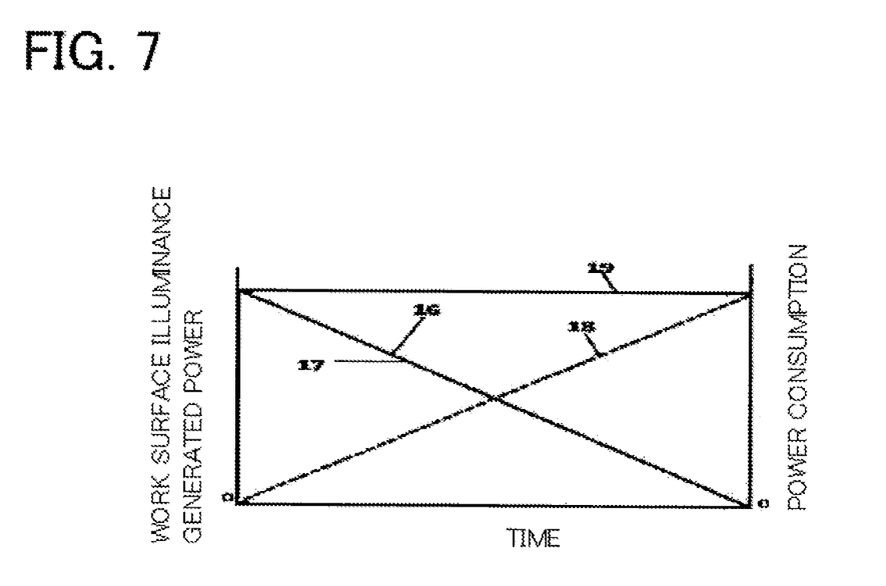
FIG. 7 is a graph illustrating relationship of the electrical power generated by the solar panel, the work surface illuminance and the power consumption for illumination.

FIG. 1 is a plan view illustrating light diffusion type skylight windows 01 and solar panels 02 installed on a roof 08. FIG. 2 shows that the sunlight 07 is irradiated to the light diffusion type skylight windows 01 and the solar panels 02 under the same conditions. FIG. 3 shows a relation of the light diffusion type skylight windows 01, the solar panels 02, a control device 03, a lighting device with light control 04, an electrical power line for light control 05, a signal wiring line or wireless line for light control 06, and a sunlight 07. FIG. 4 shows the generated power of the solar panels with respect to each time (quoted from the website of Kyushu Electric Power Co., Inc). In the figure, the upper curve 09 indicates the generated power on a bright and clear day, the middle curve 10 indicates the generated power on an irregular weather day, and the lower curve 11 indicates the generated power on a cloudy day. FIG. 5 shows actually measured outdoor illuminance 12 of an embodiment at bright and clear weather. FIG. 6 shows work surface illuminance 13 obtained by the light passed through the light diffusion type skylight windows at the same bright and clear weather as FIG. 5. In FIG. 6, a curve 15 indicates the work surface illuminance obtained by the light passed through the light diffusion type skylight windows 01 at rainy weather, and a line 14 indicates the required work surface illuminance of 400 lux. FIG. 7 shows an electrical power 16 generated by the solar panels 02, a work surface illuminance 17 obtained by the light passed through the light, diffusion type skylight windows 01, and a power consumption 18 of the lighting devices. The power consumption 18 increases when the generated power 16 and the work surface illuminance 17 due to the light diffusion type skylight windows 01 become less than the set value 19.

In case that the light diffusion type skylight windows 01 and the solar panels 02 are alternately arranged on the roof 08 under the same conditions (for example, the same angle with respect to the sunlight 07), the sunlight 07 is always irradiated to the light diffusion type skylight windows 01 and the solar panels 02 under the same conditions. In modifications, the light diffusion type skylight windows and the solar panels may not be arranged on the roof surface, but may be arranged so that the sunlight is irradiated to the light diffusion type skylight windows and the solar panels under the same conditions and that the work surface illuminance at an optional position obtained by light passed through the light diffusion type skylight windows and the generated power of the solar panels are in direct proportion with each other. Thus, the work surface illuminance 17 obtained by the light passed through the light diffusion type skylight windows 01 and the electrical power generated by the solar panels 02 are proportional to each other. The work surface illuminance 17 obtained by the light passed through the light diffusion type skylight windows 01 is measured and recorded, and the electrical power 16 generated by the solar panels 02 at an optional required work surface illuminance 14 is determined as a set power value 19. This set power value 19 is sent to the lighting devices with light control 04 via the electrical power line for light control 05, the control device 03 and the signal wiring line or the wireless line for light control 06. When the electrical power generated by the solar panels 02 is equal to or less than the set power value 19, the lighting devices 04 are turned on to use light from these lighting devices 04. When the generated electrical power becomes more than the set power value 19, the lighting devices 04 are turned off without using any special device or human operations. By providing one or more criteria, the lighting devices 04 can automatically adjust illuminance without using any illuminometer. Each of the light diffusion type skylight windows 01 has a width of 50 cm with an effective daylighting width of 47 cm, and thus can take in a lot of daylight. Since a large installation width is not necessary for the skylight windows 01, a substantially uniform indoor illuminance can be obtained even though the installation total area is 3-7% of the roof area. Therefore, the solar panels 02 can be installed more efficiently on empty space of the roof. In the above-mentioned embodiment, the light diffusion type skylight windows 01 are installed on the roof 08. However, in modifications, light diffusion type side windows may be installed on the wall and similar operations may be expected. Curves 05, 10 and 11 shown in FIG. 4 represent generated powers of the solar panels 02. These generated powers correspond to the weather conditions and are proportional to the illuminance curve obtained by the light passed through the light diffusion type skylight windows 01. Outdoor illuminance 12 shown in FIG. 5 indicates 125,000 lux at 12:40 when the weather is bright and clear. As shown in FIG. 6, the work surface illuminance 13 obtained by the light passed through the light diffusion type skylight windows 01 at that weather was maintained more than the required work surface illuminance 14 (equal to 400 lux) even when the weather was temporally cloudy around 12:00. This is because, even at the cloudy weather with no direct sunlight illumination, there was skylight illumination providing the illuminance of 0 to 50,000 lux. At the rainy weather, the work surface illuminance 15 was kept over the required work surface illuminance 14 until about 14:30, but thereafter because the illuminance became insufficient, it was necessary to turn on the lighting devices 04. As shown in FIG. 7, when the generated power was equal to or less than the set power value 19 or the work surface illuminance was equal to or less than the set illuminance value 19, the lighting devices were turned on and lighted up. The generated power 16 and the power consumption 18 of the lighting devices are inversely proportional to each other.

According to the present invention, a relationship between the work surface illuminance obtained by the light passed through the light diffusion type skylight windows and the generated power, the voltage or the current of the solar panels is measured and obtained, and, in accordance with the obtained relationship, turning on, turning off or light adjustment of the lighting devices based on the illuminance are performed without measuring the illuminance by the illuminance meter.

The present invention can utilize the electrical power generated by the installed solar panels or the minimum module of the solar panels installed for the purpose of light adjustment as a reliable sensor, and can omit various sensors such as an optical sensor, a time sensor, a human-body detection sensor or the like.

The illuminance at an optional heights due to the light transmitted through the light diffusion type skylight windows, and the generated power, the voltage value or the current value of the solar panels (installed in parallel with the light diffusion type skylight windows) are measured and the relationships between them is obtained. Also, in order to obtain a set power value for turning on, turning off or light adjustment of the lighting devices, the relationships among the required work surface illuminance of the work surface at an optional height, the illuminance of the work surface at an optional height obtained by the light passed through the light diffusion type skylight windows, and the generated power, the voltage value or the current value of the solar panels are obtained. As a result, in accordance with the set power value and the generated power of the solar panels, the turning on, the turning off or the light adjustment of the lighting devices can be effectively controlled.

The light adjusting system having light diffusion type skylight windows combined with the lighting devices with light control uses the electrical power generated by the solar panels as an illuminance sensor. The generated power of the solar panels changes greatly depending on the amount of insolation, and also the work surface illuminance obtained by the light passed through the light, diffusion type skylight windows also changes depending on the amount of insolation. These generated power and the work surface illuminance are in direct proportion to each other. By applying this principle, if the light adjustment of the lighting devices is performed depending on the generated power that varies hourly, a stable illuminance that is more than the required work surface illuminance can be always obtained without using a light sensor or other sensor.

A folded-plate roof or a sheet waterproof roof on which light diffusion type skylight windows can be installed are used for large-scale buildings. In case that the installation total area of the light diffusion type skylight windows is about 3-7% of the roof area, the work surface illuminance just below the roof becomes almost uniform. If each solar panel is arranged between the light diffusion type skylight windows, it is possible to install the solar panels in an area of almost 70% of the roof area even considering the maintenance passage so as to perform simultaneously energy saving and energy generation. If the lighting devices are not used during the day, the lifetime of the lighting devices can be extended. Since the light adjustment of the lighting devices installed in indoor is performed by using the solar panels, a safe bright illuminance higher than the work surface illuminance can be always ensured. Using of a storage battery is effective for securing the lighting power even when the external power is lost.

Japanese Industrial Standards lays down the incentive value of the required illuminance for the work surface. This value is called as the required work surface illuminance. When the work surface illuminance obtained by the light passed through the light diffusion type skylight windows is equal to the required work surface illuminance, the generated power of the solar panels is determined as a power set value. This power set value is different in each system depending on the installation conditions. The electrical power generated by the solar panels is sent to the control device to perform light adjustment of the lighting devices by wire or wirelessly.

Many widely different embodiments of the present invention may be constructed without departing from the spirit and scope of the present invention. It should be understood that the present invention is not limited to the specific embodiments described in the specification, except as defined in the appended claims.

DESCRIPTION OF REFERENCE NUMERALS

01: Light diffusion type skylight windows
02: Solar panel
03: Control device
04: Lighting device with light control
05: Electrical power line for light control
06: Signal wiring line or wireless line for light control
07: Sunlight (Direct sunlight and Skylight)
08: Folded-plate roof
09: Electrical power generated by solar panels at bright and clear weather
10: Electrical power generated by solar panels at unseasonable weather 11: Electrical power generated by solar panels at cloudy weather
12: Outdoor illuminance at bright and clear weather
13: Work surface illuminance due to the light passed through light diffusion type skylight windows at bright and clear weather
14: Required work surface illuminance
15: Work surface illuminance due to the light passed through light diffusion type skylight windows at rainy weather
16: Electrical power generated by solar panels
17: Work surface illuminance due to the light passed through light diffusion type skylight windows
18: Power consumption of lighting devices
19: Set value (Set illuminance value and set power value)

The invention claimed is:

1. A light adjustment system of lighting devices, comprising:
light diffusion type skylight windows evenly disposed on a roof surface so that a work surface illuminance becomes uniform, the work surface illuminance obtained by light that passed through said light diffusion type skylight windows at an indoor arbitrary position being measured;
photovoltaic power generation panels arranged so that sunlight is irradiated on said photovoltaic power generation panels under the same conditions as said light diffusion type skylight windows; and
a control device determining that the work surface illuminance corresponds to a required work surface illuminance, setting a power value for said photovoltaic power generation panels to a generated power, a current, or a voltage of said photovoltaic power generation panels at a time when the work surface illuminance is determined to correspond to the required work surface illuminance, and controlling at least one of turning on, turning off, and adjusting of the lighting devices using the set power value,
wherein the generated power, the current, or the voltage of said photovoltaic power generation panels and the work surface illuminance is in a direct proportion,
wherein said control device turns on the lighting devices when the generated power, the current, or the voltage of said photovoltaic power generation panels is equal to or less than said set power value, and
wherein said control device turns off the lighting devices when the generated power, the current, or the voltage of said photovoltaic power generation panels is more than said set power value.

2. The light adjustment system of lighting devices as claimed in claim 1, wherein said photovoltaic power generation panels are arranged on said roof surface.

3. The light adjustment system of lighting devices as claimed in claim 1, wherein said light diffusion type skylight windows and said photovoltaic power generation panels are alternately arranged side by side.

4. The light adjustment system of lighting devices as claimed in claim 1, wherein said light diffusion type skylight windows are installed to occupy 3-7% of an area of the roof surface and said photovoltaic power generation panels are installed in the remaining area of the roof surface.

* * * * *